US010134045B2

(12) United States Patent
Gluck et al.

(10) Patent No.: US 10,134,045 B2
(45) Date of Patent: Nov. 20, 2018

(54) AWARDING MESSAGE SLOTS FOR A CONSUMER MOBILE DEVICE CAMPAIGN

(75) Inventors: Allen Gluck, Spring Valley, NY (US); Joachim Hertel, Sunny Isles Beach, FL (US)

(73) Assignee: IPAJ, LLC, Sunny Isles Beach, FL (US)

( * ) Notice: Subject to any disclaimer, the term of this patent is extended or adjusted under 35 U.S.C. 154(b) by 1497 days.

(21) Appl. No.: 12/559,079

(22) Filed: Sep. 14, 2009

(65) Prior Publication Data

US 2011/0065421 A1 Mar. 17, 2011

(51) Int. Cl.
*G06Q 30/02* (2012.01)
*H04M 3/487* (2006.01)

(52) U.S. Cl.
CPC ......... *G06Q 30/02* (2013.01); *G06Q 30/0264* (2013.01); *G06Q 30/0275* (2013.01); *H04M 3/4878* (2013.01); *H04M 2207/18* (2013.01)

(58) Field of Classification Search
CPC ........................... G06Q 30/02; G06Q 30/0601
USPC .......................................................... 705/14
See application file for complete search history.

(56) References Cited

U.S. PATENT DOCUMENTS

| 8,102,422 | B1 * | 1/2012 | Kenderov | G06Q 30/0242 348/150 |
|---|---|---|---|---|
| 2003/0149618 | A1 * | 8/2003 | Sender | G06Q 30/02 705/14.55 |
| 2004/0204989 | A1 | 10/2004 | Dicker et al. | |
| 2004/0215526 | A1 * | 10/2004 | Luo et al. | 705/26 |
| 2005/0260993 | A1 | 11/2005 | Lovell, Jr. | |
| 2006/0242017 | A1 | 10/2006 | Libes et al. | |
| 2007/0061300 | A1 | 3/2007 | Ramer et al. | |
| 2007/0105536 | A1 | 5/2007 | Tingo, Jr. | |
| 2007/0198339 | A1 | 8/2007 | Shen et al. | |
| 2007/0265915 | A1 | 11/2007 | Gould et al. | |
| 2008/0114671 | A1 | 5/2008 | Goel et al. | |
| 2008/0215475 | A1 | 9/2008 | Ramer et al. | |

(Continued)

OTHER PUBLICATIONS

GoLive Mobile, reprinted from the Internet at http://www.golivemobile.com, Sep. 14, 2009, 2 pgs.

(Continued)

*Primary Examiner* — Rutao Wu
*Assistant Examiner* — Darnell A Pouncil
(74) *Attorney, Agent, or Firm* — Eschweiier & Potashnik, LLC

(57) ABSTRACT

Techniques and systems are disclosed for forwarding a limited number of vendor messages during a consumer mobile device campaign, such as a CSC campaign. Opt-in events are received from an aggregator's message service platform for a consumer mobile device (e.g., smart-phone), and a time interval is identified for the campaign that comprises a duration for the campaign. Campaign parameters are identified, where the parameters comprise a desired number of campaign messages for the "opted-in" consumer mobile device. Vendors are grouped into one or more campaign message categories (e.g., by service or products), and a bidding frequency is identified for campaign message categories for the campaign duration. Bids are received for message slots at the bidding frequency for a campaign message category, a desired bid is selected if it meets a threshold, and the corresponding vendor message is sent to the opted-in phone(s).

27 Claims, 10 Drawing Sheets

(56) References Cited

U.S. PATENT DOCUMENTS

2008/0270238 A1   10/2008  Zweben et al.
2011/0035276 A1*  2/2011  Ghosh et al. .............. 705/14.46
2011/0258049 A1*  10/2011  Ramer ............. G06F 17/30867
                                                                     705/14.66

OTHER PUBLICATIONS

Zestadz, reprinted from the Internet at http://www.zestadz.com, Sep. 14, 2009, 1 pg.
Motricity, reprinted from the Internet at http://www.motricity.com, Sep. 14, 2009, 1 pg.
Common Short Code Administration (CSCA), reprinted from the Internet at http://www.usshortcodes.com, Sep. 14, 2009, 2 pgs.
Mobile Marketing Association (MMA), reprinted from the Internet at http://www.mmaglobal.com/main, Sep. 14, 2009, 2 pgs.

* cited by examiner

```
01  PROCEDURE:
    IDLE:    Wait for incoming event
             Wake up by receiving an event: [m, tₘ, j] with 1 ≤ j ≤ N₁
    RUN:
05  SET bid_list = SELECT ALL bids WHERE:
        segment = P AND ((type = R AND tm + j* Δt ∈ T1) OR type = D
        bid_list = 0
    IF:
    THEN:    no qualifying bid found
    ELSE:    at least one qualifying bid found.
10          SORT bid_list by bidder_id
            DO FOR ALL bidder_id:
                Keep the most qualifying bid only
            ENDDO
            Update bid_list to contain most qualifying bids only:
15          Set bid_list = {b1, ... bn}
            Set max_bid_premium= MAX[bid amount in bid_list];
            Calculate Minimum Bid Amount for Premium:
            Set MBAP = MBAP (tₘ + j* Δt )
            IF:     max_bid_premium < MBAP
20          THEN:   no qualifying bid found
            ELSE:   max_bid_premium is high enough.
                    IF:    max_bid_premium is unique (i.e. only ONE winner)
                    THEN:  Get account data of winning bidder
```

FIG. 7a

```
25    IF:    account balance < max_bid_premium
      THEN:  cancel bid, update account statistics, go back and try next bid in line
      ELSE:  update account balance and do housekeeping for statistics
             Get msg_ptr of bid and select MSG_LIST_P
30           Set msg = MSG_LIST_P[j] with 1 ≤ j ≤ N₁
             Push <m, msg of winning bid> to SMS aggregator platform and wait for confirmation
             Receive confirmation "Message send to m" from SMS aggregator platform
             Increase message counter of m by +1
      ENDIF
35    ELSE:  max_bid_premium is NOT unique (i.e. there are at least two winners)
             DO WHILE there is more than one winner:
             Discard winners, where the budget is too small
             Select the one with the biggest increment
                Select the one with the biggest budget
40                 Select the one with the lowest number of wins
                       Make a random decision to select winner
             ENDDO
             For the unique winner proceed as above
      ENDIF
45  ENDIF
   ENDIF
   IDLE
   END PROCEDURE
```

FIG. 7b

```
01 PROCEDURE:
   IDLE:    Wait for incoming event
            Wake up by receiving an event: [t, j] > with 1 ≤ j ≤ k
   RUN:
05 LOCK category j            (* i.e. hold all new opt-ins to this category for the duration of this calculation*)
   Set mlist = Select phone_number m for all opt-in phones with message counter < N and opt-in = active and catidx = j
   Set P =Count[mlist]
   SET bid_list = SELECT ALL bids WHERE:
        segment = C AND catidx = j AND ((type = R AND t ∈ T1 AND P ∈ s1) OR type = D)
10 IF:      bid_list = 0
   THEN:    no qualifying bid found
   ELSE:    at least one qualifying bid found.
            SORT bid_list by bidder_id
            DO FOR ALL bidder_id:
15              Keep the most qualifying bid only
            ENDDO
            Update bid_list to contain most qualifying bids only:
            Set bid_list = {b1, ... bn}
            Set max_bid_premium= MAX[bid amount in bid_list];
20          Calculate Minimum Bid Amount for Category:
            Set MBAC= MBAC [j,t ,P]
            IF:     max_bid_premium < MBAC
            THEN:   no qualifying bid found
            ELSE:   max_bid_premium is high enough.
25              IF:     max_bid_premium is unique (i.e. only ONE winner)
                THEN:   Get account data of winning bidder
```

FIG. 8a

```
25  IF:    account balance < P * max_bid_premium
    THEN:  cancel bid, update account statistics, go back and try next bid in line
    ELSE:  update account balance and do housekeeping for statistics
           Get msg_ptr of bid and select MSG_LIST_C
30         Set msg = MSG_LIST_C[idx] with idx=Mod[j,N₂]
           Push <mlist, msg of winning bid> to SMS aggregator platform and wait for confirmation
           Receive confirmation "Message send to mlist" from SMS aggregator platform
           DO For all m in mlist
              Increase message counter of m by +1
35         ENDDO
    ENDIF
    ELSE:  max_bid_premium is NOT unique (i.e. there are at least two winners)
           DO WHILE there is more than one winner:
              Discard winners, where the budget is too small
40            Select the one with the biggest increment
                 Select the one with the biggest budget
                    Select the one with the lowest number of wins
                       Make a random decision to select winner
           ENDDO
45         For the unique winner proceed as above
    ENDIF
           ENDIF
       ENDIF
    UNLOCK category j
50  IDLE
    END PROCEDURE
```

FIG. 8b

AWARDING MESSAGE SLOTS FOR A CONSUMER MOBILE DEVICE CAMPAIGN

BACKGROUND

Short Message Service (SMS, a.k.a. "texting" or "text messaging") is a common way to send short text or binary data to a mobile device, such as a mobile phone (or smart phone), personal digital assistant (PDA), or other portable communication device. SMS supports text messages of up to one-hundred and sixty characters each, although longer messages can be divided into smaller segments to accommodate this limitation. Multimedia Messaging Service (MMS) is an extension of SMS that allows for longer messages and multimedia content (e.g., video, images, audio, rich text) to be sent and received by mobile devices. Content of MMS messages can also typically be viewed using a wireless access point (WAP) that connects to the Internet.

SMS (and MMS) communications can be sent from a plurality of devices and/or services, such as directly from mobile devices, from computers, from Internet-based services, and from commercial aggregations services. SMS messages can be sent and received across almost all mobile device operator networks, and almost every mobile phone sold in recent years supports SMS. As such, currently there are about eighty billion text messages per month in the United States alone.

As SMS service is becoming more popular and accepted as a form of communication it has created a large addressable market for SMS-based advertising campaigns. SMS service has become increasingly relevant for direct advertising and is becoming one of the preferred platforms for many advertisers. For example, a vendor can directly send SMS communications to one or more potential consumers from a target group with a tailored message, using server-based technology.

Common Short Code based SMS campaigns are a specific way to engage the mobile device user in a way that can avoid unsolicited messages. Generally speaking, Common Short Codes (CSCs) are short numeric codes (typically either five-digit or six-digits) to which text messages can be sent from a mobile device. Wireless device users can send text messages to CSCs to access a wide variety of mobile content, which is sent back to the user's device. CSCs are compatible across all participating carriers, typically the major domestic or international mobile phone operators (e.g. ATT, Verizon, Sprint, T-Mobile and others). Providers and vendors using the CSCs can take advantage of CSCs to provide an interactive mobile experience. Applications on a server, for example, can route messages addressed to the CSC number from wireless networks initiating a message.

Similar to a website URL, a CSC can drive targeted mobile device users to a common method of interaction. For example, a call-to action advertisement, such as a poster, may invite the mobile device user to send a certain keyword to a Common Short Code (e.g. send "Demo" to 12345) which triggers an opt-in procedure the customer has to acknowledge to be "opted-in" to the campaign. Once acknowledged, the vendor (e.g., advertiser) can send messages to the mobile device for the duration of the campaign.

Common Short Code based SMS/MMS campaigns are regulated in an effort to protect consumers and mitigate a user receiving unsolicited messages to their mobile device and to avoid flooding of network resources by too many messages. A regulatory body in the United States, the Common Short Code Administration (CSCA), provides documentation on various aspects of CSC based SMS/MMS campaigns and directs those implementing CSC campaigns to follow the industries "Best Practices". Another industry association that provides guidelines and documentation for its members is the Mobile Marketing Association.

Common to both organizations is a guideline stating that whenever a mobile device "opts-in" to a CSC campaign, the opt-in message must use specific wording and needs to indicate how many messages the user can expect to receive during the campaign's duration. A number of messages received by the mobile user can be very important, as the user typically pays for inbound messages, and/or a level of consumer dissatisfaction can increase as the number of messages received increases.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an environment where a large number of potential advertisers (e.g., vendors wishing to send targeted messages to consumers) have an ability to send several messages to consumers that have "opted-in" to a Common Short Code (CSC) based campaign, a consumer may be quickly overwhelmed by Short Message Services and/or Multimedia Message Services (SMS, MMS) sent to their mobile device, for example. However, this type of CSC campaign model would violate the codes of conduct and/or best practices of the industry, and likely alienate consumers to using CSC based campaigns.

Current technologies exist for providing a limited number of campaign messages to a consumer, for example, by providing a cut-off for messages sent to a consumer once the consumer's limit is met. As an example, a consumer may opt-in to a campaign with a limit of eight messages, and once the limit is met no more messages can be sent to that consumer. However, this can limit the vendor messages to the first eight sent from a plurality of vendors, thereby excluding some vendors (e.g., if there are more than eight in the campaign), and/or prevent vendors from getting messages to consumers that may be deemed to be of more value (e.g., if the valuable message is not one of the first eight).

Current technologies do not provide for awarding a limited number of message slots to vendors during a lifetime of a consumer mobile device based campaign, such as a CSC based campaign, whereby a vendor can effectively vie for the message slot against other vendors. Consequently, there is a need for technology that can deliver this service and effectively enable consumer mobile device based campaigns in environments, for example, that comprise a plurality of vendors wishing to communicate with consumers (e.g., a shopping mall).

Techniques and systems are disclosed for providing a consumer mobile device based campaign, such as for receiving SMS and/or MMS from vendors, where respective vendors can provide a desired number of messages for a campaign session that respects an "opted-in" mobile device user's desired number of messages received during a campaign. For example, where a shopping center may have a number of vendors that wish to provide messages (e.g., advertisements, coupons, special deals, etc.) to targeted shopping center patrons who have opted-in to the campaign, the techniques and systems, disclosed herein, can provide for limiting the number of messages received by a patron to a number selected by the patron by utilizing message slot bidding between the vendors.

Further, the techniques and systems disclosed provide an improvement to the consumer opt-in process during the campaign's duration. For example, by grouping vendors into disjoint groups called categories, where a number of categories are typically much less than a number of vendors, a consumer chooses one category at a particular time during the duration of the campaign. Further, an improvement to message slot awarding during the campaign's duration utilizes a bidding process that can run independently for respective categories at different times during the campaign. For example, by determining a desired number (e.g., minimum) number of bids needed for respective message slots, based on real-time data and other campaign parameters, an open message slot can be awarded to a winning bid for respective categories, such that a total number of messages received by an "opted-in" device does not exceed a number desired by the consumer.

In one embodiment for forwarding a limited number of vendor messages during a consumer mobile device campaign based on real time data and event driven bidding, one or more opt-in events are received from an aggregator's message service platform for a consumer mobile device (e.g., mobile smart phone), for example, where a consumer has sent an appropriate opt-in response from their mobile device to a CSC for the campaign. In this embodiment, a time interval can be identified for the campaign that comprises a campaign duration (e.g., time during which the consumer is at a shopping center during hours of operation). A plurality of campaign parameters can be identified, which can include, but is not limited to, a desired number of campaign messages for the "opted-in" consumer mobile device, such as by setting a default, or allowing the consumer to select a desired number of messages in a follow-up SMS message.

Further, in this embodiment, a plurality of vendors can be grouped into one or more campaign message categories, such as categories relating to types of goods and/or services provided by the vendors. A bidding frequency can be identified for respective campaign message categories for the campaign time interval, such as sending a message every thirty minutes for the respective categories (e.g., every thirty minutes send a message for sporting goods, a message for restaurants, a message for jewelry, etc.). Bids can be received for one or more vendor campaign messages according to the bidding frequency for a campaign message category, which can comprise a vendor's bid amount (e.g., a base bid for the message slot), bid increments (e.g., an amount added to a base bid if the base bid is not a winning bid for the message slot), and a vendor message to be sent if they win the message slot.

Additionally, in this embodiment, the desired bid (e.g., one with a highest bid amount) can be identified from the received bids, and it can be compared with a bid threshold (e.g., a minimum bid amount that also meets the consumer's desired received message number for that category) for the campaign message category. If the desired bid meets the bid threshold the vendor message can be transmitted to an "opted-in" consumer mobile device using the aggregator's message service platform.

In another embodiment, a system for awarding a limited number of message slots to vendors during a consumer mobile device campaign based on real time data and event driven bidding can comprise a message communication component that communicates with an aggregator's message platform. The message communication component may communicate with the aggregator's message platform in order to receive opt-in events from consumer mobile devices, and/or to send messages to consumer mobile devices.

In this embodiment, the system can comprise a database component that stores one or more of: campaign information (e.g., parameters), vendor information (e.g., vendor message), bidding information (e.g., bid amounts), and information about an "opted-in" consumer mobile device (e.g., a mobile phone number). The system can further comprise a bidding event component that manages bidding events for campaign message slots, which in-turn can comprise a bidding event scheduler that determines a schedule for message slot bidding, and a bidding event initiator that initiates a message slot bidding event at a scheduled time.

Additionally, in this embodiment, the system can comprise a bid determination component that identifies a desired bid for a campaign message slot, which may be based on one or more of: bidding information (e.g., bid amounts), vendor information (e.g., category), campaign information (e.g., duration, frequency), and information about the "opted-in" consumer mobile device. A bid awarding component can award the campaign message slot to a vendor having the desired bid if it meets a bidding threshold for the event campaign message slot. Also, in this embodiment, a vendor message communications component can provide the winning vendor's message to the message communication component, for example, which can communicate with the aggregator's message platform to send the message to the "opted-in" consumer mobile device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is an example sign that may be utilized for informing a consumer of the CSC campaign, and information for opting-in.

FIGS. 7a and 7b are exemplary portions of pseudo-code logic for an exemplary method for handling a premium campaign message slot bidding events.

FIGS. 8*a* and 8*b* are exemplary portions of pseudo-code logic for an exemplary method for handling a category campaign message slot bidding events.

DETAILED DESCRIPTION

Figure 1:
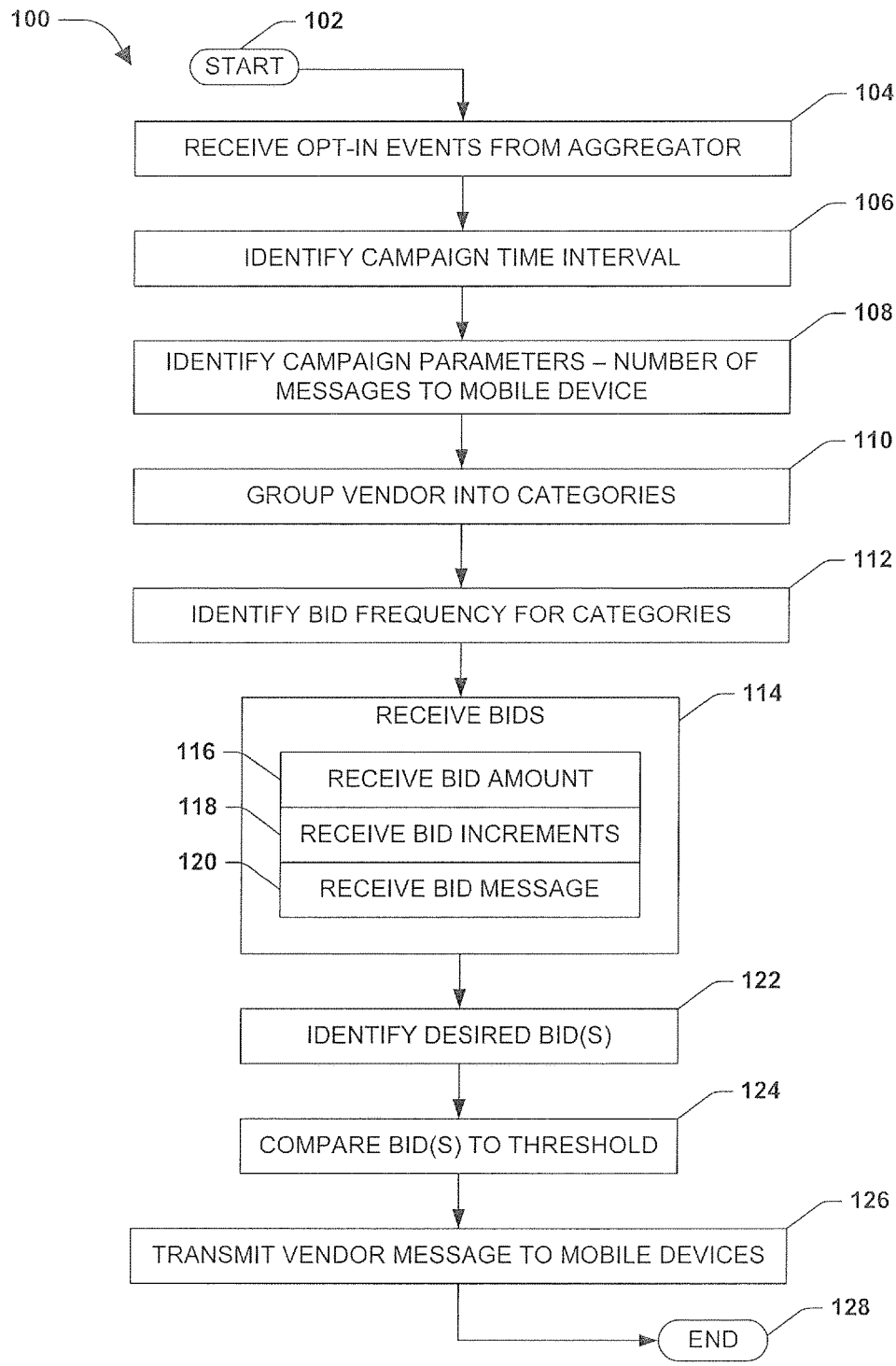
FIG. 1 is a flow chart diagram illustrating an exemplary method for forwarding a limited number of vendor messages to a consumer mobile device during a consumer mobile device campaign that is based on real time data and event driven bidding.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that allows vendors wishing to send, for example, short message service (SMS) and/or multimedia message service (MMS) messages to a consumer mobile device that has opted-in to a consumer mobile device based campaign, such as a common short code (CSC) campaign, where the number of message slots available to vendors is limited by a consumer's desired number of messages received, and the message slots are awarded to vendors based on a bidding process. FIG. 1 is a flow chart diagram illustrating an exemplary method 100 for forwarding a limited number of vendor messages to a consumer mobile device during a consumer mobile device campaign that is based on real time data and event driven bidding.

The exemplary method 100 begins at 102 and involves receiving one or more opt-in events from an aggregator's message service platform for a consumer mobile device. For example, a potential consumer may enter an area that is utilizing a CSC based campaign that allows vendors to send target messages to consumers, such as a shopping area (e.g., a mall, center, or district), fair, festival, or other location that comprises a plurality of vendors vying for consumers.

Figure 2:
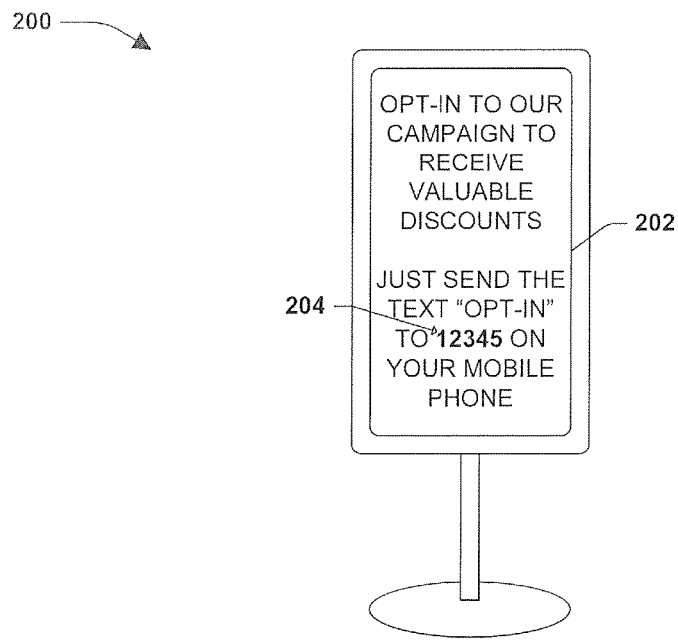

In one embodiment, for example, a shopping mall may utilize promotional messages, such as illustrated by the example sign 200 in FIG. 2, to lure consumers to the campaign. The example sign 200 displays a CSC campaign notice 202, which can be displayed at consumer entrances, for example, informing the potential consumer of the campaign and how to opt-in. Typically, a notice 202 will tell the consumer to send a text message to a CSC 204 in order to "opt-in" to the campaign. Further, the message 202 can offer incentives to a consumer for opting-in, such as discounts, special programs, or timely information. Typically, for example, an area covered by the campaign, such as a shopping area, will have merely a single CSC so that potential consumers can opt-in to the campaign using a same CSC, thereby associating particular consumer devices with a particular campaign.

In another embodiment, consumers may utilize a web-based service to opt-into a campaign. For example, a campaign area may utilize promotional messages, such as illustrated by the example sign 200 in FIG. 2, to lure consumers to the campaign. In this example, instead of displaying the CSC opt-in, the message may display a website that consumers can navigate to in order to opt-in to the campaign. It will be appreciated that opting in to the campaign is not limited to the embodiments described herein. It is anticipated that those skilled in the art may devise alternate techniques and systems that allow a consumer to opt-in their mobile device to said campaign. For example, any appropriate means may be devised that allows the consumer to register their mobile device with the campaign, thereby opting in the consumer mobile device to the campaign.

Figure 3:
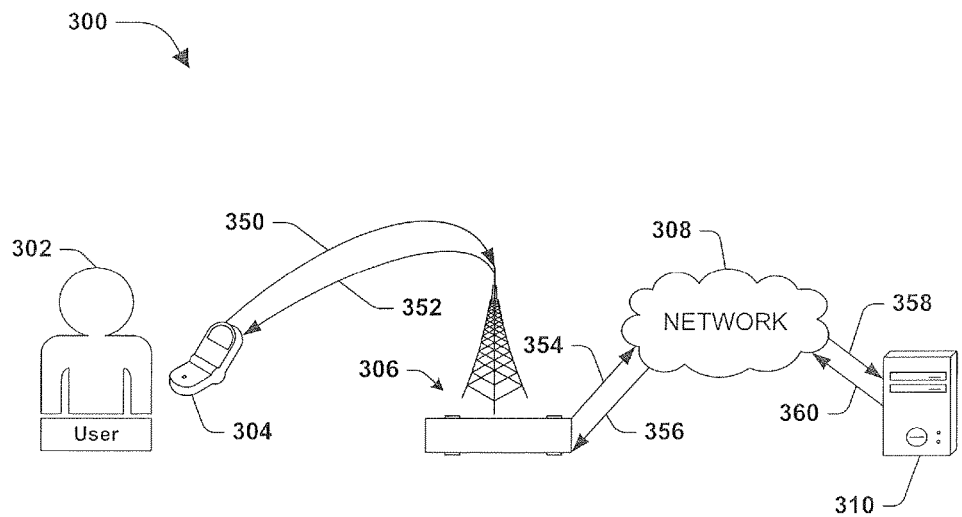
FIG. 3 is an illustration of an exemplary CSC campaign communications environment where one or more of the techniques and systems may be utilized.

In one embodiment, as illustrated in the example CSC campaign communication environment 300 of FIG. 3, an "opt-in" SMS can be sent 350 from a consumer mobile device 304 to a CSC for the campaign, such as a potential consumer 302 responding to a CSC campaign opt-in display. In this example 300, a CSC aggregator 306 receives the opt-in message from the consumer mobile device 304 and sends it 354 from the aggregator's platform 306 through a network 308, such as the Internet or an Intranet. In this embodiment, the "opt-in" event is received 358, for example, by the CSC campaign server 310 for the campaign area (e.g., the shopping mall), which registers the consumer mobile device 304 for the campaign.

Returning to FIG. 1, at 106, a time interval for the campaign is identified, where the time interval comprises a campaign duration, such as a remaining number of hours that a shopping area may be open for the day from a time that a consumer mobile device opted-in to the campaign (e.g., time from when the consumer opted-in until time the mall closes). In one embodiment, identifying the time interval for the campaign comprises identifying a desired beginning and ending time for the campaign, wherein the time interval between the beginning and ending times comprises the campaign duration. For example, if a consumer enters a fairground at eleven AM, sees a CSC campaign poster at an entrance and opts-in to the campaign, and the fair is open until eleven PM, the beginning time can be eleven AM and the ending time can be eleven PM. Therefore, in this example, the time interval is twelve hours, which comprises the campaign duration.

In another example, a desired beginning time may be selected by the campaign, such that regardless of when a consumer opts-in to the campaign, the beginning time may occur at some set time after a number of consumer devices have opted-in. Further, a desired ending time may be triggered by a number of consumer devices falling below the threshold, such as may occur when consumers opt-out of the campaign. In this example, a campaign may have a threshold number of consumer devices opted-in to maintain the campaign in order to meet parameters set by vendors (e.g., making bidding on message slots worthwhile to a vendor). It will be appreciated that desired beginning and ending times for a campaign are not limited to these examples, and it is anticipated that other means for determining these times can be devised by those skilled in the art.

At 108 in the exemplary method 100, a plurality of campaign parameters are identified, one of which comprises a desired number of campaign messages for the opted-in consumer mobile device (e.g., one of a potential plurality of consumer mobile devices for which an opt-in event was received for the campaign). For example, a consumer may merely wish to receive a limited number of campaign messages from vendors, because the consumer may be paying for each message received by their mobile device, and/or consumer dissatisfaction often increases as the number of advertising messages received increases. Also, current industry standard best practices outline conduct for CSC campaigns, which includes limiting the number of messages sent to consumers.

In one embodiment, the desired number of campaign messages for the opted-in consumer mobile device may comprise a default number that is set by the campaign. For example, based on industry standard best practices and/or information gathered by a campaign manager the default number of messages may be set at eight for the duration of the campaign, where the consumer's mobile device merely receives a total of eight campaign messages during the lifetime of the campaign (e.g., while the consumer is in the shopping area).

In one aspect, one or more "opt-in" options can be provided to the opted-in consumer mobile device. In one embodiment, in this aspect, an option message can be sent to the consumer mobile device, where the option message provides a user with information that allows them to select campaign options. For example, as shown in the example environment 300 of FIG. 3, the campaign server 310 can send 360 a campaign options message over the network 308, which is received 356 by the aggregator platform 306, and transmitted 352 to the consumer's mobile phone 304. In this embodiment, one of the opt-in options may be selection of a number of desired campaign messages for the duration of the campaign. As an example, the user 302 can enter a desired number into their phone 304 as an SMS message and send it 350 using the CSC to the aggregator's platform 306. The desired number can be transmitted 354 and 358 back to the campaign server 310, where the information will be stored and associated with the mobile phone 304, for the duration of the campaign.

In another embodiment, when identifying campaign's parameters the parameters can also comprise a desired number of premium campaign messages for the opted-in consumer mobile device, and/or a desired number of category campaign messages for the opted-in consumer mobile device. For example, a premium campaign message may be one that is not related to a particular category, that is, the vendor associated with the premium message may desire a broader coverage, it may relate to an event, and/or some non-specific information. In this example, a desired number of premium messages can be determined, such as described above.

Further, for example, a category campaign message may be one that is related to a particular group of vendors, such as restaurants, electronics, sporting goods, games and rides, or any other way of grouping vendors. In this embodiment, a desired number of messages may be for the respective categories (e.g., one from each category), a total number of category messages, or a total number for one category. In this embodiment, a desired number of category messages can be determined, such as described above.

Returning to FIG. 1, at 110 of the exemplary method 100, a plurality of vendors are grouped into one or more campaign message categories. In one embodiment, the number of categories is less than a number of potential vendors for the campaign. For example, typical fairs or festivals have many food vendors, clothing vendors, gift or novelty vendors, games, rides, attractions, and other vendors, and they can be grouped by these broad categories. As another example, the food vendors may be grouped by types of food (e.g., ethnicity), and the other vendors can also be further broken down into various categories of varying granularity. Typically, the number of categories will be far less than the number of vendors, for example, as may be seen when one visits a mall information kiosk that identifies the vendors by category.

In one embodiment, when identifying a campaign's parameters such as for the one or more "opt-in" options described in 108 above, the parameters can also comprise campaign categories. For example, the opt-in option message sent to a consumer mobile device may ask the consumer to select one or more categories from which they can receive campaign messages. In this way, the consumer mobile device can be linked with the one or more categories, for example, by storing the information in a data base on the campaign server. In one embodiment, the opt-in option may merely allow the consumer to select one category from which to receive messages. In another embodiment, more than one, or all of the categories may be selected.

At 112 in the exemplary method 100, a bidding frequency for the campaign message categories is identified for the campaign's time interval (e.g., duration). That is, it can be determined how often vendor bidding will occur for message slots available for each of the categories into which the vendors have been grouped, for example. In one embodiment, the bidding frequency will be related to a number of desired campaign messages associated with one or more consumer mobile devices. In this embodiment, the time interval for the campaign can be combined with the desired number of campaign messages (e.g., divide the desired number of campaign messages into the time interval) to determine the bidding frequency (e.g., every 20 minutes).

In this embodiment, the bidding frequency can be determined for the respective categories, for which bidding frequency can differ. Further, in another embodiment, a bidding frequency may be determined for the respective consumer mobile devices, or for several by grouping the mobile devices into similar time intervals for the campaign. Additionally, in another embodiment, the respective opted-in mobile devices can be grouped and a bidding frequency can be collectively calculated that incorporates the respective desired number campaign messages for each of the devices. In this embodiment, the frequency may be adjusted as devices opt-in and/or opt-out of the campaign.

In one aspect, category bidding events can be scheduled for respective categories based on the identified bidding frequency for respective campaign message categories. For example, a bidding frequency for a "sporting goods" category may be once every thirty minutes. In this example, if the opt-in event occurred at one PM, the next scheduled bidding event for "sporting goods" can be one thirty PM.

In one embodiment, of this aspect, scheduling category bidding events for the categories can comprise scheduling bidding for a category message slot (e.g., an available slot for sending a SMS message to one or more consumer mobile devices, based on the desired number of campaign messages for that device or group of devices) from an indexed sequence of the categories, using timed intervals associated with the bidding frequency. For example, an index of categories may comprise a list in some hierarchical order (e.g., alphabetical, level of importance, number of vendors per category, etc.), and the message slots can be selected in order from the campaign index.

In this embodiment, the bid scheduling for each of the categories can occur in accordance with the index by scheduling bidding events in a sequence (e.g., not at a same time), according to the bid frequency associated with the respective categories. For example, in an index that comprises: attractions, dry goods, food vendors, games, and rides, in alphabetical order, where the bid frequencies are twenty minutes, respective bidding events can be scheduled accordingly for each category.

Returning to FIG. 1, at 114 of the exemplary method 100, bids are received from the one or more of the plurality of vendors for a campaign message category, such that the bidding occurred in accordance with the associated bidding frequency (e.g., at a scheduled bid event time). A bid received (e.g., by the campaign server) from a vendor (e.g., electronically sent from a vendor computer networked to the campaign server) comprises a vendor's bid amount, for example, how much the vendor is willing to pay for the particular category message slot (e.g., in order to send a message to one or more opted-in devices). For example, a vendor may bid five dollars for the message slot that would give them an ability to send a message to one or more opted-in devices for that category.

Further, the bid comprises a vendor's desired bid increments, for example, how much the vendor is willing to increase their bid amount in order to overcome a tie in bid amounts with another vendor. For example, where two or more vendors bid five dollars for a message slot, a first vendor's bid may include a bid increment of fifty cents. In this example, a bid increment may be used to overcome a tie in base bids by increasing the bid by fifty cents. In another embodiment, the bid increment may be used to adjust for a large overbid from a next highest bid, for example, where a first vendor bids four dollars and a second vendor bids five dollars; the fifty cent increment can be used to adjust the second vendors bid downward, making the it four dollars and fifty cents, overcoming the first vendor's bid of four dollars. In another embodiment, the vendor bid can comprise a maximum bid amount, for example, where a vendor's base bid can be incrementally increased by the bid increment in order to overcome a competing bid, at least until the maximum bid amount is met.

Further, the bid comprises a vendor's campaign message information, for example, comprising the message that the vendor wishes to send to the one or more opted-in devices if their bid is successful. In one embodiment, the bid can include the actual vendor message, for example, where a vendor creates the messages "on-the-fly", such as during a dynamic sales event. In another embodiment, the vendor message portion of the vendor bid may comprise a pointer, such as a link or memory address, that identifies a location of the vendor message. In another embodiment, the campaign server may store a plurality of vendor messages pre-submitted by the vendors participating in the campaign, and the vendor may merely identify the message selected for the associated message slot of the bid, for example, using an index number assigned to them by the campaign.

In one aspect, bids received from vendors for campaign messages can comprise a plurality of information. In one embodiment, the received bids can comprise one or more of: a campaign message time interval, such as a time interval during which the bid is active (e.g., how long the bid is valid), a bidder identification; a bid type, such as a regular bid for merely the one message slot bidding event, or a default bid that can be used for more than one message slot bidding event; a bid segment index, such as a message category indicator if the bid is for a category campaign message (e.g., a number corresponding to the category index), or a null indicator if the bid is for a premium campaign message; and a desired number of opted-in consumer mobile devices for the campaign for the bid to be considered active, such as a minimum number of devices.

In this aspect, the campaign may provide for one or more bid limitations, as described above, that can modify the vendor bid for the message slot bidding event. For example, in order for vendors to submit a bid (e.g., when a vendor determines a cost-benefit analysis for a message cost), in one embodiment, a vendor may desire a minimum number of opted-in consumer mobile devices for the bid to be active for the message slot. In another embodiment, a campaign manager may desire a maximum number of opted-in consumer mobile devices for the bid to be active for the message slot, for example, in order to segment bid events based on expected value (e.g., a greater number of opted-in devices may provide for a higher bid amount). It will be appreciated that the techniques and systems are not limited to the embodiments and examples described above. It is anticipated that those skilled in the art may devise alternate limitations for vendor bids.

Returning to FIG. 1, at 122 of the exemplary method 100, a desired bid is identified from the received bids for the campaign message category. In one embodiment, a desired bid may comprise a highest bid amount for the category message slot submitted selected from one or more bids submitted by vendors. In another embodiment, the desired bid may be identified by a one or more bid limitations, as discussed above, where a bid limitations can be assigned values based on desired characteristics, such as a bid type, desired number of consumer devices, and/or campaign message time interval, for example. In this embodiment, the bid limitations can be prioritized and a desired bid determined by identifying the bid having a highest number of prioritized limitations, for example. In another embodiment, values assigned to bid limitations can be combined, for example, and a result can be calculated for respective bids. In this embodiment, for example, the result having a desired value (e.g., highest or lowest depending on the values assigned) can be selected as the winning bid.

It will be appreciated that the techniques and systems described herein are not limited to the embodiments described above for determining a desired bid. It is anticipated that those skilled in the art may devise alternate methods for determining a desired bid (e.g., a winning bid) for a category message slot.

At 124 in the exemplary method 100, the desired bid is compared to a bid threshold for the campaign message category. For example, a minimum bid amount can be assigned to a message slot for a campaign message category, such as based on an expected return on value for the cost of the campaign. In one embodiment, there may be more than one bid threshold that can be based on one or more of the bid limitations described above. As an example, one of the bid thresholds may have a particular campaign message time interval, which a desired bid may have to meet. As another example, the desired bid may be compared to a plurality of bid thresholds, each of which is met in order to be selected as a winning bid.

At 126 of the exemplary method 100, if the desired bid meets the bid threshold for the campaign message category (e.g., or the one or more bid thresholds), the vendor message associated with the desired bid can be transmitted to one or more opted-in consumer mobile devices using the aggregator's message service platform. For example, as illustrated by the example environment 300 in FIG. 3, the vendor message that was submitted with the bid to the campaign server 310 can be transmitted 360 to the aggregator's message platform 306 over the network, such as the Internet. In this example, the aggregator can forward the message 352 to a consumer's mobile phone 304, where the consumer 302 can read the message.

Figure 4:
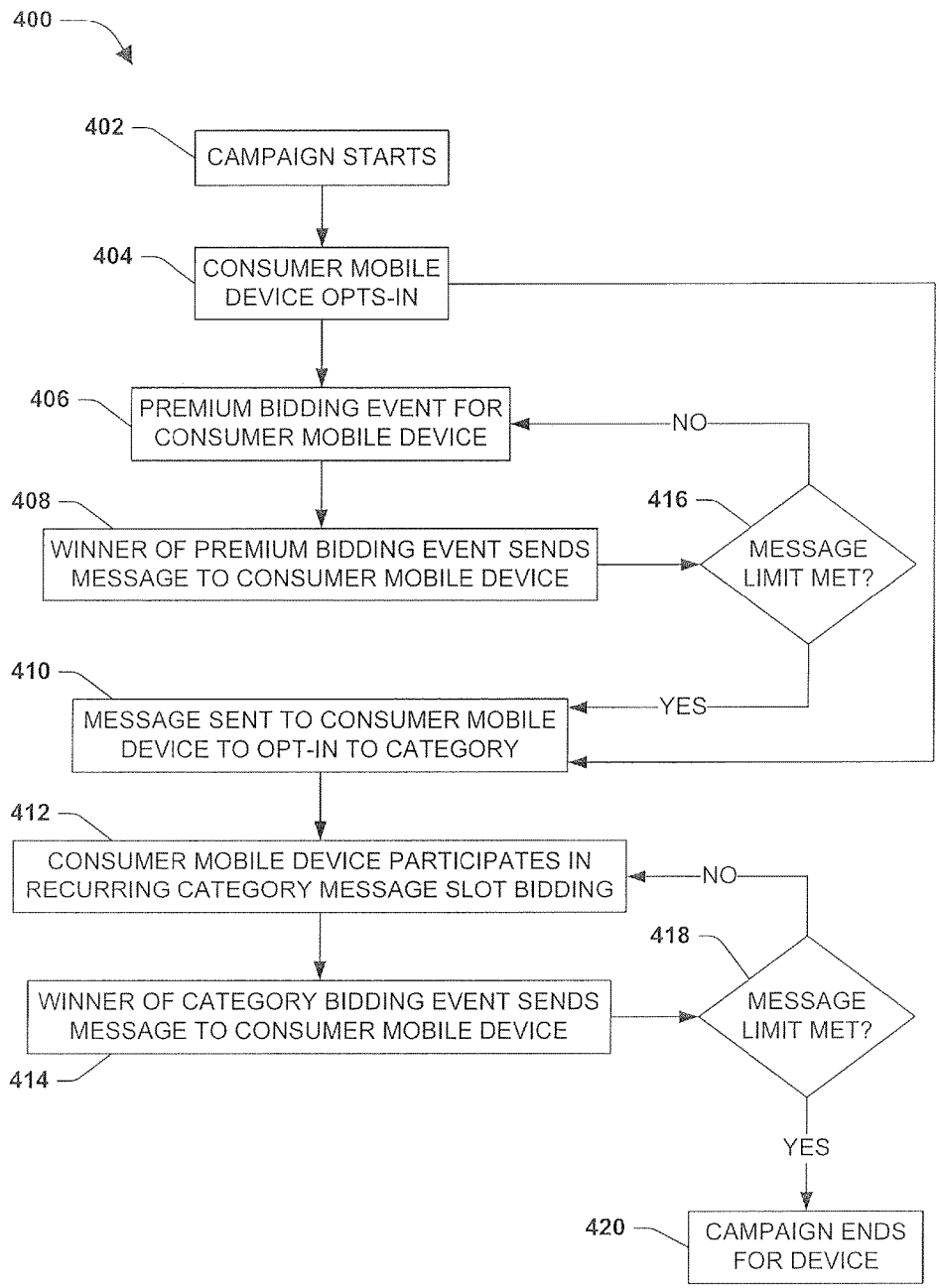
FIG. 4 is a flow diagram illustrating one embodiment of the example methods described herein.

FIG. 4 is a flow diagram illustrating one embodiment 400 of the example methods described herein. At 402 the campaign starts, for example, when a campaign area opens for business (e.g., the shopping mall opens and the campaign server begins the campaign). At 404, a consumer mobile device opts-in to the campaign, for example, where a consumer sees a poster that directs them to send an "opt-in" SMS message to a CSC that is particular to the campaign, as described above.

In one embodiment, when a consumer device opts-in to the campaign the consumer mobile device can be assigned to a default category at a time of opting-in. For example, prior to a user option being selected (e.g., an opt-in option as described above) that assigns the device to one or more categories, the device can be assigned to a default category, such as "general" (e.g., all vendors categories combined). In this way, for example, if a bidding event occurs prior to opt-in options being selected for the device, the device can still receive messages from a winning vendor for that message slot. Further, as another example, the default category may be used when a consumer does not select a category for the device to be assigned. Additionally, in this embodiment, when a user option is selected for the device, which assigned the device to a category, the consumer mobile device can be removed from the default category.

Figure 4A:
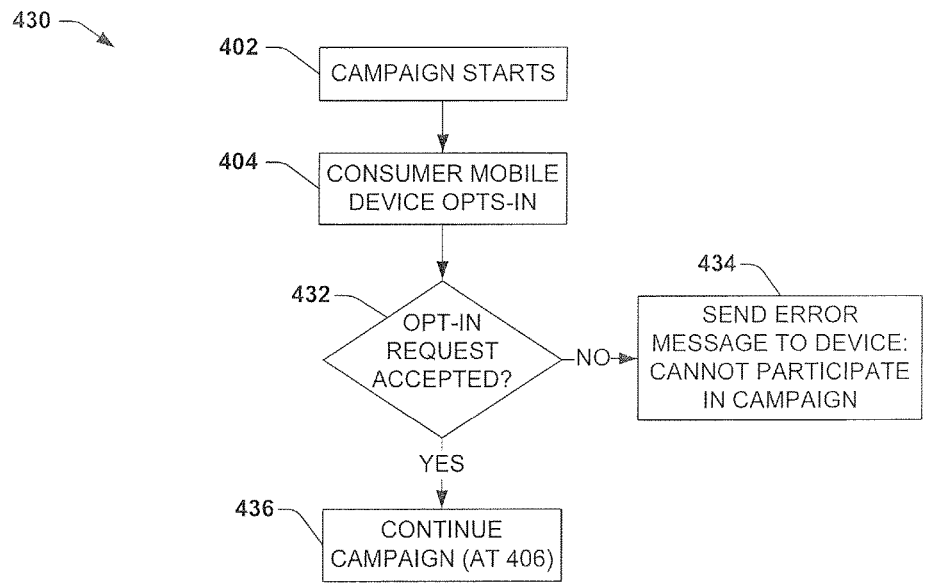
FIGS. 4a and 4b are exemplary embodiments of portions of the methods described herein.

In another embodiment, as illustrated by the flow diagram 430 of FIG. 4a, after the consumer mobile devices opts-in, 404, it is determined whether the opt-in request is accepted, at 432. For example, the campaign may only allow devices to opt-in during a time interval chosen for the campaign. In this example, if the device does not opt-in during the time interval for the campaign an opt-in request may not be accepted.

As another example, the campaign server may comprise security components/services that can determine whether a device opting into the campaign is legitimate, or an attempt to compromise security. Further, as another example, the campaign server may comprise a database that can compare the consumer mobile device against information stored in the database. In one embodiment, the device opting in may not be desirable for the campaign (e.g., abused the system, multiple logins, stolen device, etc.), and an opt-in request may not be accepted. At 434, if the opt-in request is not accepted for the campaign, an error message can be sent to the device, notifying the consumer that the device cannot participate in the campaign. If the opt-in request is accepted, at 436, the campaign can continue, for example, as shown in 406 of FIG. 4.

In the exemplary embodiment 400 of FIG. 4, at 410, a message is sent to the consumer mobile device, such as an opt-in option message described above, that directs the consumer to select or "opt-in" to one or more categories for the campaign. At 406, a premium bidding event for the consumer mobile device can occur. In one embodiment, prior to the premium bidding event, and after receiving an opt-in event, one or more bidding time intervals can be identified for premium message bidding events when identifying the campaign's parameters. As described above for identifying bidding time intervals for category bidding events, similarly, premium bidding frequencies can be determined by identifying a premium bid interval.

In one embodiment, after identifying the bid intervals, the premium bid events can be scheduled at desired premium event time intervals during the campaign after an opt-in event is received. In this embodiment, the number of premium bidding events can be the desired number of premium campaign messages for the consumer mobile device for which an opt-in event was received. For example, where a consumer mobile device has by default or selected a desired number of premium campaign messages to be received for the campaign, the scheduling of the premium messages can be determined by combining the desired number with the time intervals for the premium bid events.

At 406, when the premium bidding event occurs, a desired bid can be identified for one or more of the premium messages, as described above. At 408, a winner of the premium bid event, such as a vendor having a highest bid value that meets the bid threshold, can send their premium message to one or more of the opted-in consumer mobile devices. As an example, the messages can be sent from the campaign server to the aggregator's platform, from which the message can be sent to a plurality of opted-in devices.

At 416, it is determined whether a premium message limit has been met for the consumer mobile device, and if not, at 406, another premium bidding event can occur at a next scheduled time. If the message limit has been met for premium messages, in one embodiment, a message can be sent to the consumer mobile device to opt-in to one or more categories (e.g., typically one category per campaign). In an alternate embodiment, a category selection opt-in option message can be sent after the consumer device opts-in, as described above, and category bidding events can occur, for example, relatively concurrently with premium bidding events.

At 412, a consumer mobile device (or a plurality of devices) participates in recurring category message slot bidding events. As described above, category bidding events can be scheduled based on the time intervals determined for the respective categories, based on certain limitations. At the scheduled times, a category message slot can be bid on by one or more vendors. At 414, the winner of the category message slot bidding event can have their category message sent to the consumer mobile device (or plurality of devices), for example, using the aggregator's message platform.

At 418, if the message limit has not been met for the consumer mobile device, another bidding event can occur for the mobile device, at 412, and another message sent at 414. However, if the message limit has been met for the consumer mobile device, at 420, the campaign ends for that device. In one embodiment, regardless of a time duration for a campaign (e.g., mall closes at 10 PM, so campaign ends at 10 PM), if the message limit is met for a particular opted-in device the campaign will end for that device. One of the purposes of the techniques and systems, described herein, is to provide a way for vendors to send messages to consumers while respecting a consumers limits on receiving messages (e.g., as described in the industry standard best practices for CSC campaigns).

Figure 4B:
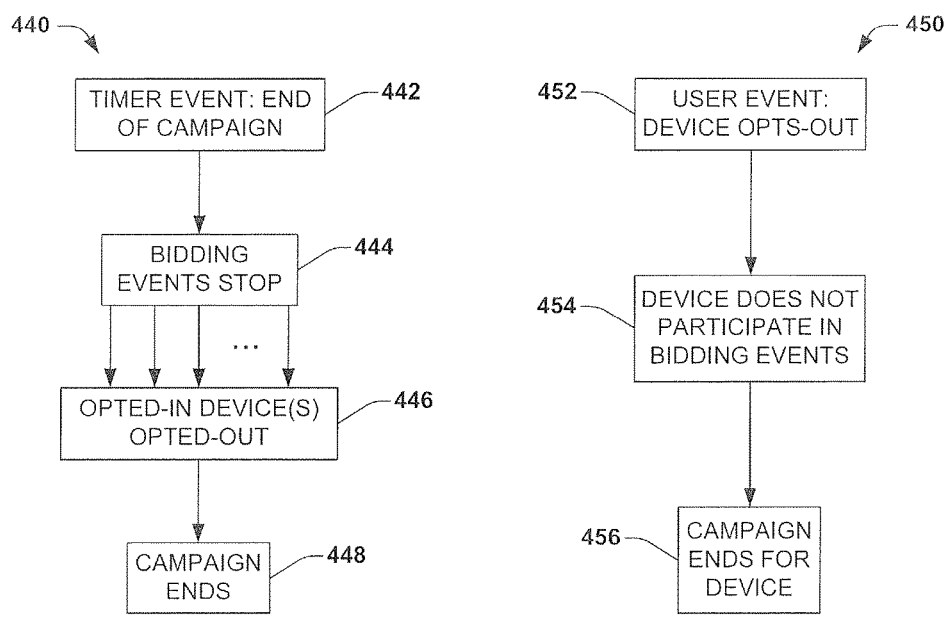

While the campaign for a particular opted-in consumer mobile device can end after a limit of messages has been reached, for example, as described above, in another embodiment, a campaign may end for a particular mobile device when the device is opted out of the campaign, as illustrated by the example flow diagram 450 of FIG. 4b. At 452, a user event occurs where the consumer mobile device opts-out of the campaign. That is, a user/consumer of the opted-in mobile device performs steps that cause the device to be opted out of the campaign. In one embodiment, opting-out of the campaign may comprise sending an SMS message to the CSC for the campaign stating "opt-out". For example, the opt-in message sent to the device can describe a way for a consumer to opt-out of the campaign, and/or a sign in the campaign area may describe the method for opting out.

After opting-out of the campaign, at 454, the device not longer participates in bidding events. For example, when determining bidding event parameters, which may provide limitations for the bids, as described above, the opt-out device is no longer used in the bidding process (e.g., one less phone for the message slot). At 456, the campaign ends for the opted-out consumer mobile device.

The example flow diagram 440, of FIG. 4b, illustrates another embodiment of how a campaign may end. At 442, a timer event occurs (e.g., not a user event) that ends the campaign. For example, the campaign time interval may comprise an ending time, such as when a shopping center closes for the day. In this example, the timer event (e.g., close of operations) causes the campaign to end. At 444, the bidding events stop for the campaign, and the devices opted-in to the campaign (e.g., all of the opted-in consumer mobile devices) are opted-out of the campaign, at 446. The campaign ends, at 448.

Figure 5:
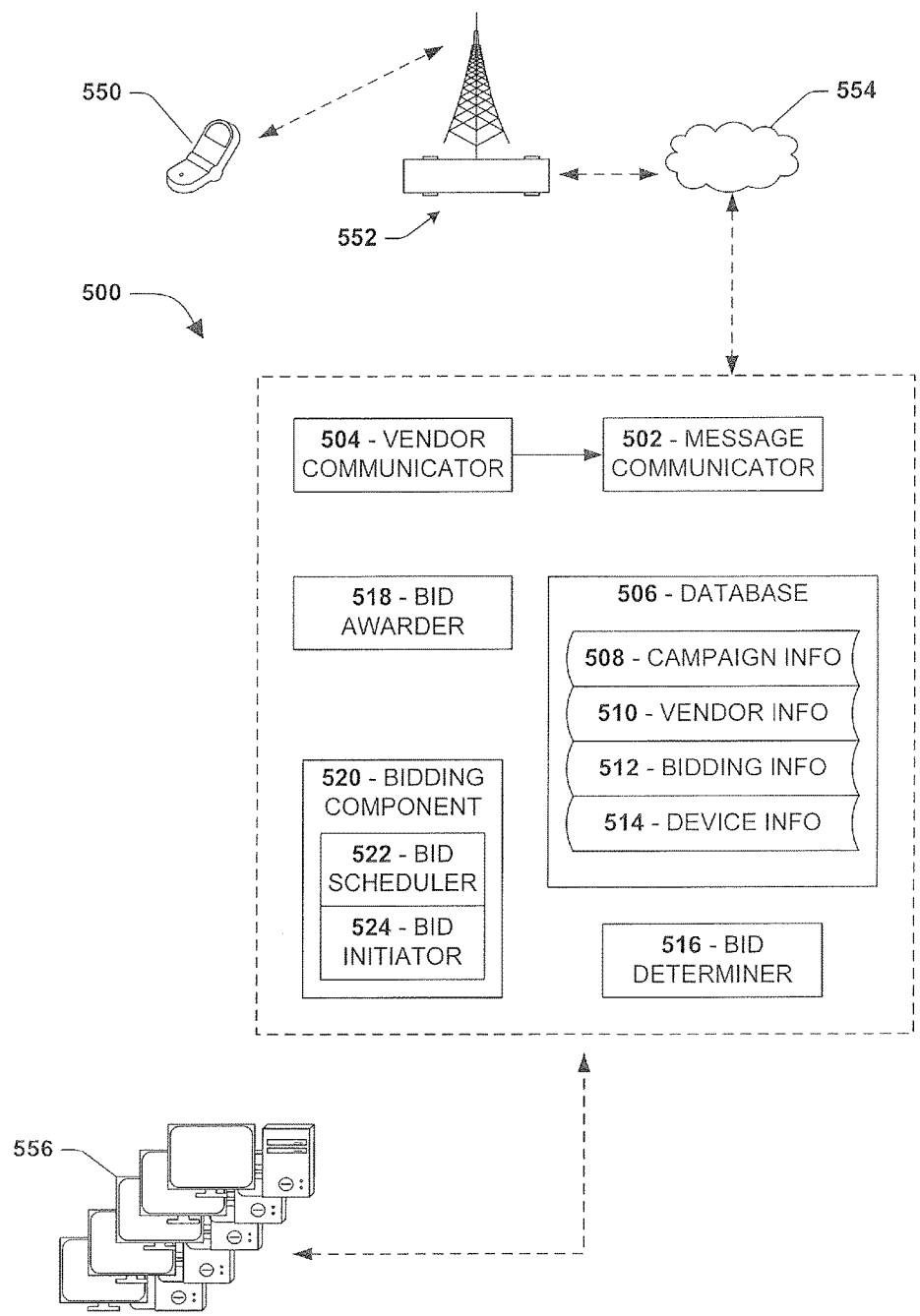
FIG. 5 is a component block diagram of an exemplary system for awarding a limited number of message slots to vendors during a consumer mobile device campaign based on real time data and event driven bidding.

A system may be devised that can be used for a common short code (CSC) based campaign, for example, where a consumer device that opts-in to the campaign receives merely a number of campaign messages that they desire (e.g., based on a known default number or a number chosen by the consumer). FIG. 5 is a component block diagram of an exemplary system 500 for awarding a limited number of message slots to vendors during a consumer mobile device campaign based on real time data and event driven bidding.

In this example, the system 500 comprises a message communication component 502 that communicates with an aggregator's message platform 552. In one example, the communication between the message communication component 502 and the aggregator's message platform 552 can occur over a network 554, such as the Internet or an intranet, where both the example system 500 and the aggregator's platform 552 are connected to the Internet remotely from each other.

The message communication component 502 communicates with the aggregator's message platform 552 to receive opt-in events from consumer mobile devices 550 and send messages to consumer mobile devices 550. For example, a consumer can opt-in to a CSC campaign by sending a short message service (SMS) message (e.g., a text message: "opt-in") to a CSC, which is specific to the campaign, indicating their desires to register the mobile device with the campaign. In one embodiment, the campaign can utilize a means to provide an opt-in message to the consumer, such as the exemplary sign 200 of FIG. 2, which tells the consumer how to opt-in to the campaign.

When the consumer uses the CSC to send a message, for example, the message is sent to the aggregator's message platform 552 (e.g., the aggregator manages the messages for that particular CSC), which, in turn, forwards the message to the message communicator 502 (e.g., the campaign manager registered to use the CSC). Further, when sending out campaign messages to opted-in devices, for example, from vendors that win a bidding event for a message slot, the message communicator 502 can send the messages to the aggregator's platform 552, which can forward them to the consumer mobile device that has opted-in 550. Typically, the aggregator's platform will utilize a wireless communications platform, such as a mobile phone system, to transmit the messages (e.g., SMS, MMS) to the opted-in devices.

The exemplary system 500 further comprises a database component 506 that can store campaign related data. Campaign related data can include, but is not limited to, campaign information 508 (e.g., time intervals, communications information, etc.), vendor information 510 (e.g., identification, vendor categories, etc.), bidding information 512 (e.g., bid amounts, bidding frequency, etc.), and information about an "opted-in" consumer mobile device 514 (e.g., desired number of messages, mobile phone number, etc.). In one embodiment, the database 506 can reside on a server (e.g., or data storage system comprising one or more servers and data storage devices) that stores and manages data for the campaign.

The exemplary system 500 further comprises a bidding event component 520 that manages bidding events for campaign message slots. The bidding event component 520 comprises a bidding event scheduler 522 that determines a schedule for message slot bidding events, and a bidding event initiator 524 that initiates a message slot bidding event at a scheduled time.

For example, the bidding information 512 can comprise a bid frequency that identifies how often a particular bid is to take place (e.g., every thirty minutes for a particular category message, and/or every hour for a premium message). In this example, the bid scheduler 522 can utilize the bid frequency to determine a schedule for the bids (e.g., at two PM, two thirty PM, etc.), based on the campaign time interval information (e.g., from a time the device opted-in until the shopping center closes) that may be stored with the campaign information 508. Further, for example, when a scheduled bid time is reached the bid initiator 524 can initiate the scheduled bidding event (e.g., by sending out a bidding event notice to respective vendors registered for the particular bid event).

In the exemplary system 500, a bid determination component 516 identifies a desired bid for a campaign message slot bidding event. The desired bid is identified based on one or more of: bidding information 512 (e.g., a base bid amount from respective vendors), vendor information 510 (e.g., is the vendor registered for the message slot category), campaign information 508 (e.g., is the bid submitted during an appropriate time interval for the message slot), and opted-in device information 514 (e.g., has the desired number of campaign messages been reached for the device).

For example, vendors may utilize computer systems 556, which are connected to the campaign server over a private network (e.g., local area network, Intranet, etc.). Upon notification of a bidding event, the vendors can submit bids using their connected computers 556 to the campaign server. The bid determination component 516 can identify a desired bid for the campaign message slot based from the submitted bids, based on appropriate bidding event parameters, as described herein A bid awarding component 518 awards the bidding event campaign message slot to a vendor that has submitted the desired bid, if the desired bid meets a bidding threshold for the event campaign message slot. In one embodiment, the bidding event campaign message slot may have a threshold dollar amount (e.g., and/or some other bid limitation) associated with it that a desired bid (e.g., winning bid) needs to meet in order for the vendor to be awarded the campaign message slot for the bidding event. For example, the campaign may set a minimum bid price of $2.00 for a message slot in a category of "restaurants" that enables a vendor to send a message to ten opted-in devices. In this example, if the winning bid is equal to or greater than $2.00, the vendor associated with that bid will be awarded the message slot.

Further, in this embodiment, a threshold value can change according to a variety of parameters associated with respective bidding events. For example, premium bidding events may have a higher threshold (e.g., higher value), and/or have more limitations (e.g., message content limitations, bidder qualifications), while bidding events that involve fewer opted-in devices may be worth less, and/or may have fewer limitations.

In the exemplary system 500, a vendor message communications component 504 provides a desired vendor message to the message communication component 502, where the vendor message corresponds if from the vendor that was awarded the bidding event campaign message slot (e.g., winning bidder). In one embodiment, the vendor message can be submitted with respective bids for the bidding event, and the vendor message communications component 504 can forward the message from the bid to the message communication component 502. In another embodiment, the vendor message may be stored in the database 506, and using a vendor ID, or a message ID (e.g., such a link to a memory location in the database), for example, the vendor message communications component 504 can retrieve the vendor message, such as from the vendor information 510, and forward it to the message communication component 502.

As described above, for example, the message communication component 502 can forward the winning vendor message to the aggregator platform 552, over a communications network 554 (e.g., the Internet), which can send the vendor message as a SMS or MMS to respective opted-in consumer mobile devices 550. In turn, in this example, the devices 550 receive the message, which can be viewed by the consumers.

Figure 6:
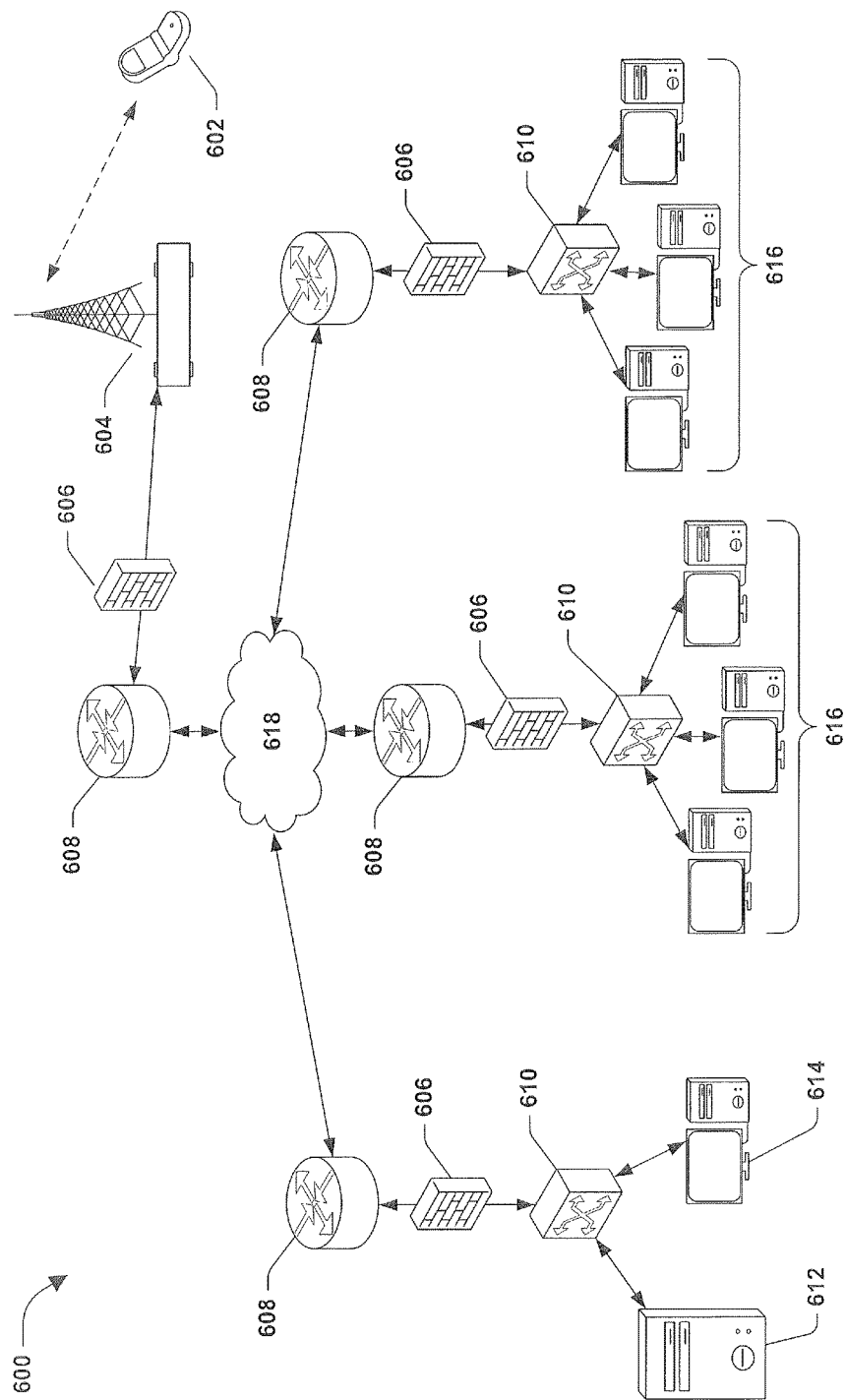
FIG. 6 is a component block diagram illustrating an example embodiment of an environment that can utilize the exemplary systems and techniques described herein.

FIG. 6 is a component block diagram illustrating an example embodiment 600 of an environment that can utilize the exemplary system 500 described in FIG. 5. In this environment 600, at least some of the components of the exemplary system 500 can reside in/on a campaign server 612, which may be located at a site of the campaign (e.g., in a shopping mall) or may be located remotely from the campaign site (e.g., at a CSC-based campaign management center). The campaign server 612 can be linked by a communications switch 610 (e.g., through a communication network, either locally, such as a LAN, or remotely, such as over the Internet or an Intranet) to a campaign management interface component 614, such as a general use computer or Internet-linked monitor, located at the campaign site (or remotely).

In this embodiment, the system can comprise an operator management component (e.g., residing on the campaign server 612, or the campaign management interface component 614) that is coupled with the database component (e.g., either locally or remotely using the communications network), comprising a user interface that allows an operator to manage campaign related parameters, such as campaign duration, vendor registrations, etc. In one embodiment, the operator management component can comprise a web-based secure e-commerce application, for example, where a campaign operator/manager logs onto a website to access the operator management component through a secure Internet link.

In this example environment, the router 610 operates behind a firewall 606 (e.g., a hardware and/or software firewall to mitigate malicious attacks), and is linked through a router 608 (e.g., a wireless access Point (WAP) or LAN router) to the Internet 618 (or Intranet). The aggregator's communications platform 604 also operates behind a firewall 606 and is linked by a router 608 to the Internet 618. In one embodiment, the aggregator's platform 604 utilizes a mobile phone communications system, such as one of the major U.S. carriers (e.g., AT&T, Verizon, Sprint, etc.), to send and/or receive messages to/from a consumer mobile device 602 (e.g., mobile phone).

Vendors utilizing the consumer mobile device (e.g., CSC) campaign can use computing devices 616, such as general purpose computers and/or mobile devices capable of Internet access, to access campaign services. The vendor computing devices 616 can be located at the respective vendor locations, for example, or may be able to remotely access the system. In one embodiment, the campaign system can comprise a vendor management component (e.g., residing on the vendor computer or campaign server) that is coupled with the database component (e.g., 506 of FIG. 5) that comprises a user interface allowing the vendors to manage vendor related account information, such as bid information, vendor identification, messages, categories, etc. In one embodiment, the vendor management component can comprise a web-based secure e-commerce application, as described above, where the vendor logs onto a secure website to manage their vendor information, for example.

In this exemplary environment, the vendor computing devices 616 are linked to a router 608 through a firewall 606, and connected by a communications network switch. As illustrated in FIG. 6, a first set of vendors can be located remotely from a second set of vendors, which may or may not be linked locally, and/or remotely from each other. Respective vendor devices 616 are linked to the Internet 618, which is connected to the campaign server 612, for example, so that they can submit bids and generally participate in campaign related activities.

An alternate method may be devised for awarding a limited number of message slots during a common short code (CSC) campaign based on real time data and event driven bidding. A CSC based campaign (CPM) can be defined by {CSC, [Ti, Tf], $\Delta T$, oir}, where: CSC is a common short code for the campaign; [Ti, Tf] is a duration of the campaign having a time interval that starts at Ti and ends at Tf; $\Delta T$ is a time value, where Ti+$\Delta T$<Tf; and oir is a rule that allows opt-in requests for the campaign to be accepted merely during a time interval [Ti, Ti+$\Delta T$], for example, before an end of the campaign.

Campaign specific parameters N, $N_1$, $N_2$, $\Delta t$ are set, where: N has a value less than a desired upper number of campaign messages an opt-in device can receive during the duration of the campaign; $N_1$ is a desired upper number (e.g., an upper limit chosen for an opted-in device) of premium-vendor messages an opt-in phone can receive during the duration of the campaign, which has a value greater than or equal to zero; $N_2$ is a desired upper number of category-vendor messages an opt-in phone can receive during the duration of the campaign, which has a value greater than or equal to zero; and $\Delta t$ describes one or more time intervals at which premium messages bidding events are scheduled after a new opt in request has been accepted, where, if at time ($t_m$) where Ti$\leq t_m+N_1*\Delta t \leq$Ti+$\Delta T$ a new opt in request of mobile device (m) is accepted, bidding events for premium messages to device m are scheduled at times $t_m+j*\Delta t$, where $1 \leq j \leq N_1$, and where N=$N_1+N_2$.

A plurality of vendors ($A_s$), where a number of vendors is greater than or equal to 1 (e.g., where for $A_1$ through $A_s$ s$\geq$1), are grouped into one or more categories ($C_k$), where a number of categories is greater than or equal to one and less than the number of vendors (e.g., where for $C_1$ through $C_k$ 1$\leq$k<s). A "more opt in options" message (M) is sent to the device m that has opted in at time $t_m$ and that has not opted out prior to the more opt-in options message event, at time $t_m+(N_1+1)*\Delta t$. The sending of the more opt-in options message comprises inserting m into a default category (0) at time $t_m+(N_1+1)*\Delta t$, unless a user selection for a different category is received prior to inserting m into 0. Further, if the user selection comes after inserting m into 0, m is removed m from 0.

A bidding frequency parameter ($f_i$) is defined for respective categories $C_i$, where 1$\leq$i$\leq$k, where, for the duration of the campaign, for every $f_i$ timer unit a bidding event is scheduled for the respective categories. For example, a number of bidding events for a category is equivalent to a number of $f_i$ timer units, so that a bidding event occurs when a $f_i$ timer unit is reached (expired).

In one embodiment of this method, the vendors ($A_s$) can submit a bid, where respective bids comprise a bidder ID, having a unique identifier associating the bidder with the bidder's information. The bid further comprises a bid type, which may be a regular bid (R), comprising a higher priority bid, and/or a default bid (D), comprising a lower priority bid than R. The bid further comprises a bid segment, which may be a premium segment (P) (e.g., for a premium message slot), and/or a category segment (C) (e.g., for a category message slot).

In this embodiment, the bid can further comprise a category index that identifies a category for the bid (e.g., an index number or alpha-numeric value); a time interval (TI) during which the bid is active (e.g., a bid expiration time value); and a device index (SI) that identifies a desired number (r) (e.g., a number the vendor needs to have the bid be used) of opted in devices for the bid to be active. In one embodiment, index SI can identify a desired range of numbers of opted-in devices for the bid to be active, such as a minimum and a maximum number of devices.

In another embodiment, if the bid segment is premium (P) the SI index will be null (zero), for example, so that there is no minimum number of devices for the bid to be active for premium campaign message slot bidding events. In another embodiment, if the bid segment is category (C), the SI index can be a value for r devices that can be −1 through q, where the bid is active is r≤q; or where r can be a value p through −1, where the bid is active if p≤r; or where r can be a value of p through q, where the bid is active if p≤r≤q.

In this embodiment, the bid can further comprise a bid amount for the message slot (e.g., how much the vendor bids on the slot); a bid increment that can be added to the bid when two or more competing bids are the same; and a message identifier that identifies the vendor message associated with the bid (e.g., to be sent if the vendor's bid wins). In one embodiment, the message identifier can be a pointer to a premium message list that has no more than $N_1$ number of messages, or it can be a pointer to a category message list having no more than $N_2$ number of messages, for example, so that either a premium or category message is selected for the message slot.

In one aspect of the alternate method, premium and category message slot bidding events are scheduled for the duration of the campaign, or respective opted-in mobile device. In one embodiment, in this aspect, the premium bidding events can be scheduled at one or more times represented by $t_m+j*\Delta t$. In this embodiment, $1 \leq j \leq N_1$, $t_m$ is a time that mobile device m opted-in to the campaign, and j is an event index indicator (e.g., ID or index value) that identifies the event from a plurality of events, such as organized by the index of events (e.g., a list of events each having an index identification). In this way, as an example, if the premium bidding events can be scheduled based on the time the device opted-in, a time remaining in the campaign, and a number of messages left in the devices limit.

In another embodiment, a category specific bidding event for a category $C_j$ can be scheduled at times $t_n$ where $1 \leq j \leq k$ $t_n = Ti+n*fj$, $$1 \leq n \leq \left[\frac{Tf - Ti}{fj}\right],$$

$t_n$ comprises a time for a scheduled bidding event i; and j comprises the category index. Therefore, for example, if the category is one of the categories the vendors were grouped into, the scheduled bidding event times can be based on the beginning and ending times of the campaign, the category, and bidding frequency determined for the category.

FIGS. 7a and 7b are exemplary portions of pseudo-code logic for handling a premium campaign message slot bidding event, utilizing the variables from the alternate method described above. In FIG. 7a, such a premium bidding event is triggered by a mobile device opt-in event, as seen by the "Wake up by receiving an event: [m, $t_m$, j] with $1 \leq j \leq N_1$", in line 3. The input parameters for the premium bidding event are: the phone number m of the opted-in mobile phone; and the time of the bidding event, which is $t=t_m+j*\Delta t$, where $1 \leq j \leq N_1$, and $t_m$ is the opt-in time of mobile phone number m.

Lines 5 through 15 identify a bid list of vendor bids for the premium event, for example, keeping merely those qualified bids in the bid list. A minimum bid amount premium (MBAP) is set for the bid event, and the highest premium bid is compared to the MBAP to determine if it bids meets the threshold (e.g., the MBAP), in lines 16-21.

In FIGS. 7a and 7b, if there is merely one bidder having the highest premium bid, their account information is processed and their message is sent to the aggregator's platform for transmission, in lines 22-33. However, if there is more than one highest premium bid (e.g., two of more bidders bid a same amount), a series of alternate methods is utilized to select the winner, and the winners message is sent as before, in lines 35-43 of FIG. 7b.

FIGS. 8a and 8b are exemplary portions of pseudo-code logic for handling a category campaign message slot bidding event, utilizing the variables from the alternate method described above. In FIG. 8a, such a premium bidding event is triggered by a recurring timer event, as seen by the "Wake up by receiving an event: [t, j]> with $1 \leq j \leq k$", in line 3. The input parameters for the category bidding event are: the index j of the category, where $1 \leq j \leq k$; and the time of the event t.

A list of opted-in mobile phone numbers mlist is set, where the phone number meets qualifying parameters, in line 6. Lines 8 through 18 identify a bid list of vendor bids for the category event, again, keeping merely those qualified bids in the bid list. Much as for the premium event, described above, a minimum bid amount category (MBAC) is set for the bid event, and the highest category bid is compared to the MBAC to determine if it bids meets the threshold (e.g., the MBAC), in lines 19-24.

The remaining lines in FIGS. 8a and 8b describe the process of selecting a winning bid and sending the associated vendor message, as described above in FIGS. 7a and 7b. Having selected a winning bidder and sending the category message to one or more opted-in mobile phones, the exemplary pseudo-code goes to IDLE, at line 50, for example, waiting for another category bid event.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method of a campaign server for forwarding a limited number of vendor messages during a consumer mobile device campaign based on real time data and event driven bidding, executed via a processor on the campaign server comprising a memory whereon computer-executable instructions comprising the method are stored, the method comprising:
   receiving, via the processor of the campaign server, one or more opt-in events from a consumer mobile device communicatively coupled to an aggregator's message service platform;
   identifying, via the processor of the campaign server, a time interval of the consumer mobile device campaign comprising a campaign duration;
   identifying, via the processor of the campaign server, a plurality of campaign parameters comprising a desired number of campaign messages from the consumer mobile device, wherein the desired number of campaign messages comprises a number of message slots;
   receiving, at an input of the campaign server, vendor bids and campaign message time intervals from a plurality of vendor computing devices, wherein the vendor bids correspond to the number of message slots;
   grouping, via the processor of the campaign server, the plurality of vendor computing devices into one or more campaign message categories;
   identifying, via the processor of the campaign server, a vendor bidding frequency for respective campaign message categories for the identified campaign time interval;
   enabling, via the processor of the campaign server, a vendor computing device to communicate to the consumer mobile device via text messaging based on an awarded message slot resulting from a vendor bidding process among the plurality of vendor computing devices; and
   utilizing the awarded message slot to communicate a campaign message to the consumer mobile device based on the awarded message slot, wherein the awarded message slot corresponds to a vendor bid that satisfies a vendor bid threshold of a campaign message category, wherein the vendor bidding process comprises:
      receiving vendor bid amounts, vendor desired bid increments, and vendor campaign message information from the plurality of vendor computing devices;
      comparing the vendor bids to the vendor bid threshold for the campaign message category; and
      providing a vendor message from the vendor computing device awarded the awarded message slot to the consumer mobile device in response to an awarded bid meeting the bid threshold for the campaign message category.

2. The method of claim 1, wherein identifying the time interval for the campaign comprises identifying a desired beginning and ending time for the campaign, wherein the time interval between the beginning and ending times comprises the campaign duration.

3. The method of claim 1, identifying the campaign's parameters further comprising one or more of:
   identifying a desired number of premium campaign messages for the consumer mobile device for which the opt-in event was received; and
   identifying a desired number of category campaign messages for the consumer mobile device for which the opt-in event was received.

4. The method of claim 3, identifying the campaign's parameters, further comprising identifying one or more bidding time intervals for premium message bidding events after receiving the opt-in event.

5. The method of claim 3, further comprising scheduling one or more premium bidding events at desired premium event time intervals during the campaign after the opt-in event is received for the consumer mobile device, wherein the number of premium bidding events comprises the desired number of premium campaign messages for the consumer mobile device for which the opt-in event was received.

6. The method of claim 1, grouping the plurality of vendor computing devices into one or more campaign message categories wherein a number of categories is less than a number of potential vendor computing devices for the campaign.

7. The method of claim 1, further comprising scheduling vendor category bidding events corresponding to respective categories based on the vendor bidding frequency for respective campaign message categories.

8. The method of claim 7, scheduling vendor category bidding events corresponding to respective categories comprising scheduling a category message slot for bidding in a sequence of an index of the categories at timed intervals associated with the vendor bidding frequency.

9. The method of claim 1, further comprising receiving vendor bids from the plurality of vendor computing devices corresponding to campaign messages comprising:
  receiving a maximum bid amount;
  receiving a bidder identification;
  receiving a bid type;
  receiving a bid segment index; and
  receiving a desired number of consumer mobile devices from which the opt-in event was received in order to consider the vendor bid to be active.

10. The method of claim 1, wherein the campaign message time interval comprises a time interval during which the bid is active.

11. The method of claim 9, wherein the bid type comprises one of:
  a regular bid comprising a bid specified for one corresponding message slot; and
  a default bid comprising a bid that is utilized for more than one message slot.

12. The method of claim 9, wherein the bid segment index comprises:
  a message category indicator if the bid is for a category campaign message; and
  a null indicator if the bid is for a premium campaign message.

13. The method of claim 9, wherein the desired number of consumer mobile devices for which the opt-in event was received for the campaign comprises:
  a desired minimum number of campaign opted-in consumer mobile devices that the vendor bid is active for the message slot; and
  a desired maximum number of campaign opted-in consumer mobile devices that the vendor bid is active for the message slot.

14. The method of claim 1, further comprising: receiving an incremental amount to be added to the bid to resolve bidding conflicts.

15. The method of claim 1, wherein identifying a vendor bid comprises:
  identifying a desired bid for one or more premium messages; and
  identifying a desired bid for one or more categories.

16. The method of claim 1, further comprising providing a common short code (CSC) to consumers to use for opting-in to the campaign using the consumer mobile device.

17. The method of claim 1, further comprising providing one or more opt-in options to an opted-in consumer mobile device.

18. The method of claim 17, wherein providing one or more opt-in options to an opted-in consumer mobile device comprises sending an option message to one or more consumer mobile devices using the aggregator's message service platform wherein the option message provides a user with information that allows them to select campaign options.

19. The method of claim 18, wherein the campaign options comprise campaign categories.

20. The method of claim 17, further comprising:
  assigning the consumer mobile device to a default category at a time of opting-in to the campaign, unless a user option is selected prior to assignment; and
  removing the consumer mobile device from the default category when a user option is selected.

21. The method of claim 1, the consumer mobile device campaign comprising a common short code (CSC) based campaign.

22. A campaign server system for awarding a limited number of message slots to vendor computing devices during a consumer mobile device campaign based on real time data and event driven bidding, comprising:
  a memory that stores computer-executable components;
  one or more processors, communicatively coupled to the memory, configured to facilitate execution of the computer-executable components, the computer-executable components comprising:
    a message communication component configured to communicate with an aggregator's message platform and with a plurality of vendor computing devices, configured to:
    receive opt-in events from consumer mobile devices;
    send messages to consumer mobile devices; and
      receive, at an input of the campaign server, vendor bids and campaign message time intervals from a plurality of vendor computing devices, wherein the vendor bids correspond to the number of message slots from the plurality of vendor computing devices, and the campaign message time intervals each indicate an interval during which the bid is active;
    a database component configured to store one or more of:
      campaign information;
      vendor information from vendor computing devices;
      bidding information; and
      information about a consumer mobile device for which an opt-in event was received;
    a bidding event component configured to manage vendor bidding events for campaign message slots, comprising:
    a bidding event scheduler configured to determine a schedule for message slot bidding events; and
    a bidding event initiator configured to initiate a message slot bidding event at a scheduled time;
    a bid determination component configured to identify a desired bid from the plurality of vendor computing devices for a campaign message slot bidding event based on receiving a desired number of campaign messages from the consumer mobile device and the bidding information, the vendor information from the vendor computing devices, the campaign information, and the information about a consumer mobile device for which the opt-in event was received;
    a bid awarding component configured to award the bidding event campaign message slot to a vendor computing device corresponding to the desired bid in response to the desired bid satisfying a bidding threshold for the event campaign message slot; and
    a vendor message communications component configured to provide a vendor message to the message communication component, wherein the vendor message is communicated from the vendor computing device that is awarded the bidding event campaign message slot as a result of the message slot bidding event.

23. The system of claim 22, further comprising a means for providing an opt-in message to a user of the consumer mobile device configured to enable a user to initiate an opt-in event for the campaign using their consumer mobile device.

24. The system of claim 22, further comprising a vendor management component operably coupled with the database component, comprising a user interface and configured to allow at least one vendor computing device to manage vendor related account information.

25. The system of claim 24, wherein the vendor management component comprises a web-based secure e-commerce application.

26. The system of claim 22, further comprising an operator management component operably coupled with the database component, comprising a user interface and configured to allow an operator to manage campaign related parameters.

27. The system of claim 26, wherein the operator management component comprises a web-based secure e-commerce application.

* * * * *